United States Patent
Mihara

(10) Patent No.: US 7,291,855 B1
(45) Date of Patent: Nov. 6, 2007

(54) MEDIUM TRANSPORT APPARATUS

(75) Inventor: Tatsuya Mihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/510,665

(22) Filed: Aug. 28, 2006

(30) Foreign Application Priority Data

Mar. 17, 2006  (JP) .............................. 2006-073959

(51) Int. Cl.
*G11B 15/68* (2006.01)

(52) U.S. Cl. .............. 250/559.33; 356/614; 369/30.31

(58) Field of Classification Search .......... 250/559.29, 250/559.33; 356/614, 620; 369/30.01, 30.28, 369/30.31
See application file for complete search history.

(56) References Cited

U.S. PATENT DOCUMENTS

| | | | | |
|---|---|---|---|---|
| 5,946,160 A | * | 8/1999 | Ohashi | ........................ 360/92 |
| 6,331,714 B1 | | 12/2001 | Gardner, Jr. et al. | |
| 6,483,655 B1 | * | 11/2002 | Ojima | ........................ 360/69 |
| 6,671,574 B1 | * | 12/2003 | Hashimoto | .................. 700/215 |
| 6,717,766 B2 | * | 4/2004 | Hashimoto et al. | ........... 360/92 |
| 6,825,485 B1 | * | 11/2004 | Mehlberg | .............. 250/559.29 |
| 6,897,432 B2 | * | 5/2005 | Schmidtke et al. | ......... 250/216 |
| 7,047,106 B2 | * | 5/2006 | Butka et al. | ................ 700/245 |
| 2005/0065648 A1 | * | 3/2005 | Sasaki | ........................ 700/245 |
| 2007/0115362 A1 | * | 5/2007 | Sasaki | .................... 348/207.99 |

FOREIGN PATENT DOCUMENTS

| | | |
|---|---|---|
| JP | 5-342723 | 12/1993 |
| JP | 2000-314611 | 11/2000 |

* cited by examiner

*Primary Examiner*—John R. Lee
(74) *Attorney, Agent, or Firm*—Staas & Halsey LLP

(57) ABSTRACT

A belt-like pattern reading unit reads a belt-like pattern given to the media storage cell using an image unit provided in a hold unit. A deflection amount calculating unit measures a deviation from a reference position of a horizontal pattern borderline corresponding to a position of the hold unit on a arm unit based on the read belt-like pattern, calculates a deflection amount of the arm unit based on the measured deviation, and stores a correction value of a position corresponding to the deflection amount in a correction value storing unit. A servo control unit controls movement of the hold unit using the correction value.

4 Claims, 9 Drawing Sheets

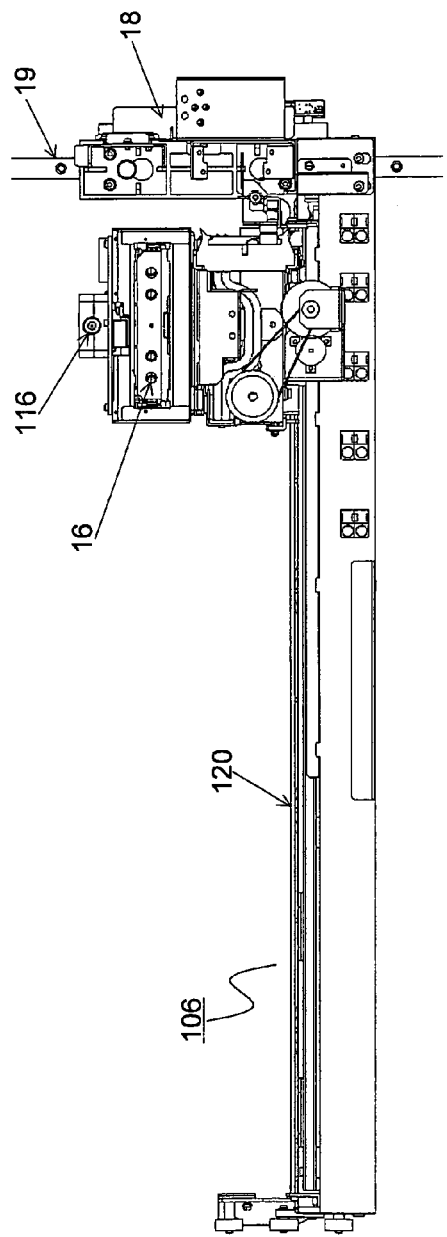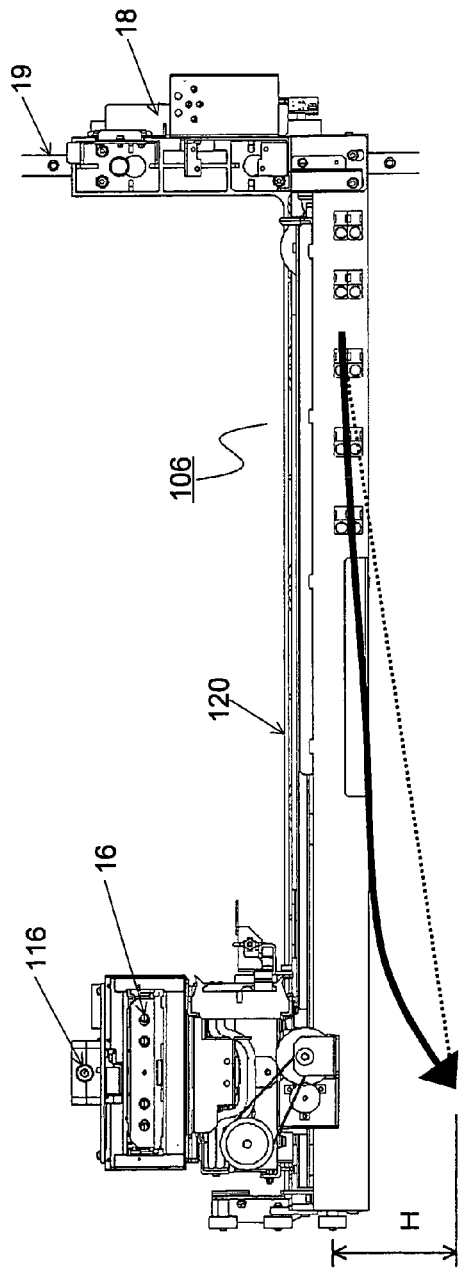
FIG.5A
FIG.5B

MEDIUM TRANSPORT APPARATUS

CROSS-REFERENCE TO RELATED APPLICATIONS

This application claims the conventional priority based on Japanese Application No. 2006-073959, filed on Mar. 17, 2006, the disclosures of which are incorporated herein by reference.

BACKGROUND OF THE INVENTION

1. Field of the Invention

The present invention generally relates to a library apparatus and so on which contains storage media such as a magnetic tape library apparatus, and particularly relates to a medium transport apparatus which detects a deflection amount when a deflection arises in a mechanism transporting a cartridge to a rack (cell) of a cartridge-type storage medium (hereinafter referred to as a cartridge), and enables accurate cartridge insertion and withdrawal to and from the cell by correcting its error.

2. Description of the Related Art

FIGS. 11A to 11C illustrate conventional techniques. In FIG. 11A, reference numeral 2 denotes a media storage cell which contains a number of media 3 such as cartridges which are to be transported. A mechanism which takes the medium 3 in and out of the media storage cell 2, and transports the medium 3 includes a hold unit 16 equivalent to a robot hand for holding the medium 3, an arm unit 15 which moves the hold unit 16 horizontally, a support unit 18 which supports the arm unit 15, and an LM rail 19 for guiding the support unit 18 and moving the support unit 18 vertically. Additionally, although not shown, each servomotor is incorporated in the hold unit 16, support unit 18 and so on.

For alignment of the hold unit 16 with the media storage cell 2, a conventional magnetic tape library apparatus with a transport mechanism (transfer robot) as shown in FIG. 11A has, for example, as shown in FIG. 11B, reference flags F1 and F2 arranged in two places in cells in both the right and left ends of the media storage cell 2, reads these flag positions using a sensor mounted in the hold unit 16, detects horizontal and vertical errors from a nominal position, and corrects linearly a relative phase error between each cell and the transfer robot using the error amount.

Additionally, as conventional techniques which determine or correct a position of a transfer robot, there are, for example, a position data correction method disclosed in Japanese Patent Laid-Open No. 5-342723, and an object position determination system disclosed in Japanese Patent Laid-Open No. 2000-314611. The technique disclosed in Japanese Patent Laid-Open No. 5-342723 is characterized in that, so as to make it possible to correct position data used for positioning control of a servo motor in high precision with a small error, data capturing for correcting position data is performed in a pitch from a reference target flag, which becomes a positioning target, to a next target flag which is adjacent to it. However, in Japanese Patent Laid-Open No. 5-342723, it is not considered at all to measure a deflection amount of an arm of the transfer robot in advance, and to perform correction based on the deflection amount.

Additionally, the technique of Japanese Patent Laid-Open No. 2000-314611 images a guide target having a shape of a right angled triangle, calculates a distance from a vertex angle by calculating a position of a point at which a scanning line intersects a base of the right angled triangle, and guides a medium handler based on the distance, for proper alignment between the medium handler and a magazine slot. This does not also take account of measuring a deflection amount of an arm in advance and performing correction based on the deflection amount.

As shown in FIG. 11A, when a transfer robot is cantilevered, a deflection may arise in the arm unit 15 owing to weight of the hold unit 16 and so on, and its deflection amount may become remarkable as a tip approaches. In this case, as shown in FIG. 11C, an error arises in a relative position error itself between a cell and the transfer robot which is detected by a conventional method, and consequently, it becomes impossible to achieve accurate insertion and withdrawal of the medium 3 to and from the cell which is to be a target. Additionally, in FIG. 11C, P11, P12, and P13 show errors of center positions of respective cells which are detected by the conventional method, and P1, P2, and P3 show actual position errors due to the deflection of the arm unit 15.

SUMMARY OF THE INVENTION

It is an object of the present invention to provide a medium transport apparatus to achieve accurate insertion and withdrawal of a medium to and from a cell by detecting a deflection amount arising in an arm unit, and correcting its error.

In the present invention, a monochrome belt-like track pattern on a media storage cell in which a medium for transportation is contained is arranged. The medium transport apparatus of the present invention detects a track of a monochrome borderline by scanning the track pattern by a sensor, and detects a deflection amount of a transfer robot using the track. Furthermore, the medium transport apparatus corrects a vertical error from a nominal position using the deflection amount to achieve accurate insertion and withdrawal of media, such as a cartridge, to and from each media storage cell.

Specifically, the medium transport apparatus of the present invention is the medium transport apparatus which moves a hold unit for a transported medium along an arm unit one side of which is supported, holds the transported medium contained in a media storage cell by the hold unit, and performs insertion and withdrawal, and transportation of the transported medium. The apparatus comprises a pattern reading unit reading a pattern given to the media storage cell and in which a line is drawn horizontally using a sensor provided in the hold unit, a deflection amount calculating unit measuring a deviation of the horizontal line in the pattern from a reference position corresponding to a position of the hold unit on the arm unit based on the pattern read by the pattern reading unit, and calculating a deflection amount of the arm unit based on the deviation of the horizontal line, a correction value storing unit storing a correction value for correcting a reference position of the media storage cell in which each transported medium is contained or corrected position information obtained by correcting the reference position based on the calculated deflection amount, and a servo control unit controlling movement of the hold unit using the correction value or the corrected position information stored in the correction value storing unit.

For example, the medium transport apparatus can be used as an apparatus for transporting a cartridge in a magnetic tape library apparatus.

Preferably, the pattern given to the media storage cell and in which a line is drawn horizontally includes a first region (for example, black) and a second region (for example, white) which are different in color or brightness, and in which their boundary forms a horizontal line. By using such a pattern, it is possible to read the pattern with a vertical line scan and to easily measure the deviation of a horizontal line from the reference position based on a length of the first region and a length of the second region in the read pattern.

According to the present invention, since it is possible to measure and correct a nonlinear deflection even if the nonlinear deflection arises in a cantilever-like arm unit, it becomes possible to accurately insert a medium into a medium storage cell, and to accurately withdraw a medium from the medium storage cell. Particularly, when a deflection amount increases owing to a secular change while it has traditionally been necessary for a maintenance person to adjust a support unit supporting an arm unit, it becomes possible to eliminate the need of adjustment by accurate positional correction.

BRIEF DESCRIPTION OF THE DRAWINGS

FIGS. 5A and 5B are front views of the accessor mechanism.

DETAILED DESCRIPTION OF THE PREFERRED EMBODIMENTS

Figure 1:
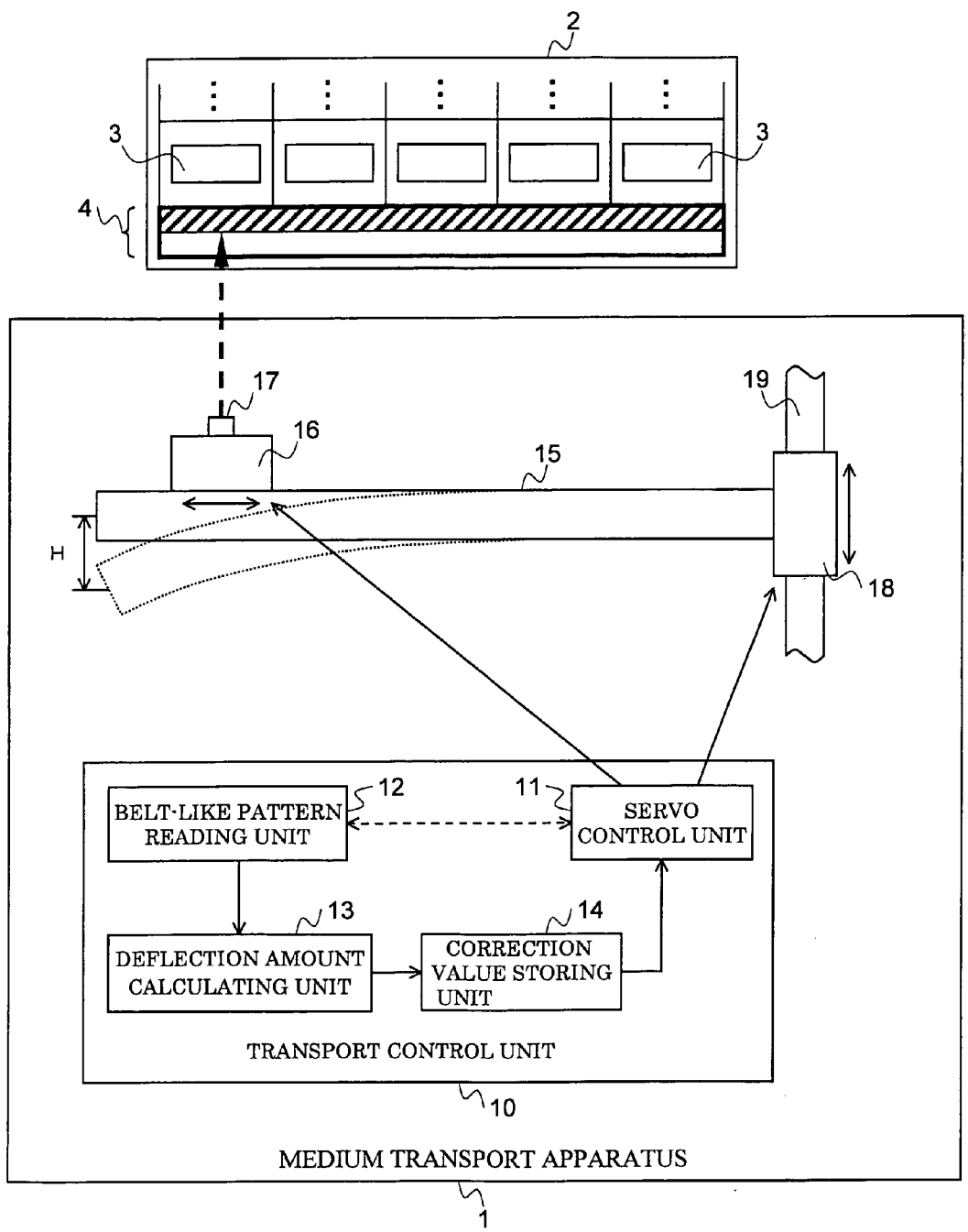
FIG. 1 is an explanatory diagram showing outline of the present invention.

Hereafter, embodiments of the present invention will be explained with reference to drawings. FIG. 1 is an explanatory diagram of outline of the present invention. In FIG. 1, reference numeral 1 denotes a medium transport apparatus according to the present invention, and reference numeral 2 denotes a media storage cell which contains a number of media 3 such as cartridges which are to be transported. A belt-like pattern 4 which has a monochrome borderline horizontally is added to the media storage cell 2.

The medium transport apparatus 1 includes a transport mechanism unit which is a mechanical mechanism transporting a medium, and a transport control unit 10 which controls the transport mechanism unit. The transport mechanism unit has a hold unit 16 holding a medium 3 which is taken in and out of the media storage cell 2, an arm unit 15 moving the hold unit 16 horizontally, a support unit 18 supporting the arm unit 15, and an LM rail 19 guiding the support unit 18 and moving the support unit vertically. Additionally, an imaging unit (sensor) 17 having a CCD and so on is incorporated in the hold unit 16. Additionally, although not shown, a servo-motor is incorporated in the hold unit 16, and the support unit 18 and so on.

A transport control unit 10 includes a servo control unit 11 which performs drive control of the servo motor incorporated into the transport mechanism, a belt-like pattern reading unit 12 which reads black and white of the belt-like pattern 4 added to the media storage cell 2 by the imaging unit 17, a deflection amount calculating unit 13 which calculates a deflection amount H of the arm unit 15 based on the read belt-like pattern, and correction value storing unit 14 which stores a correction value of a position corresponding to the calculated deflection amount. The servo control unit 11 corrects an objective position, to which the hold unit 16 is moved, based on the correction value of the position which the correction value storing unit 14 stores, and operates the transport mechanism unit. Preferably, it is also possible to store positional information after the correction by which a reference position is corrected with the correction value instead of storing the correction value for the reference position in the correction value storing unit 14.

The present invention is applied, for example, to a cartridge transport mechanism in the following magnetic tape library apparatus. Additionally, the present invention is also applicable similarly to a transport mechanism of other reading medium and so on.

Figure 2:
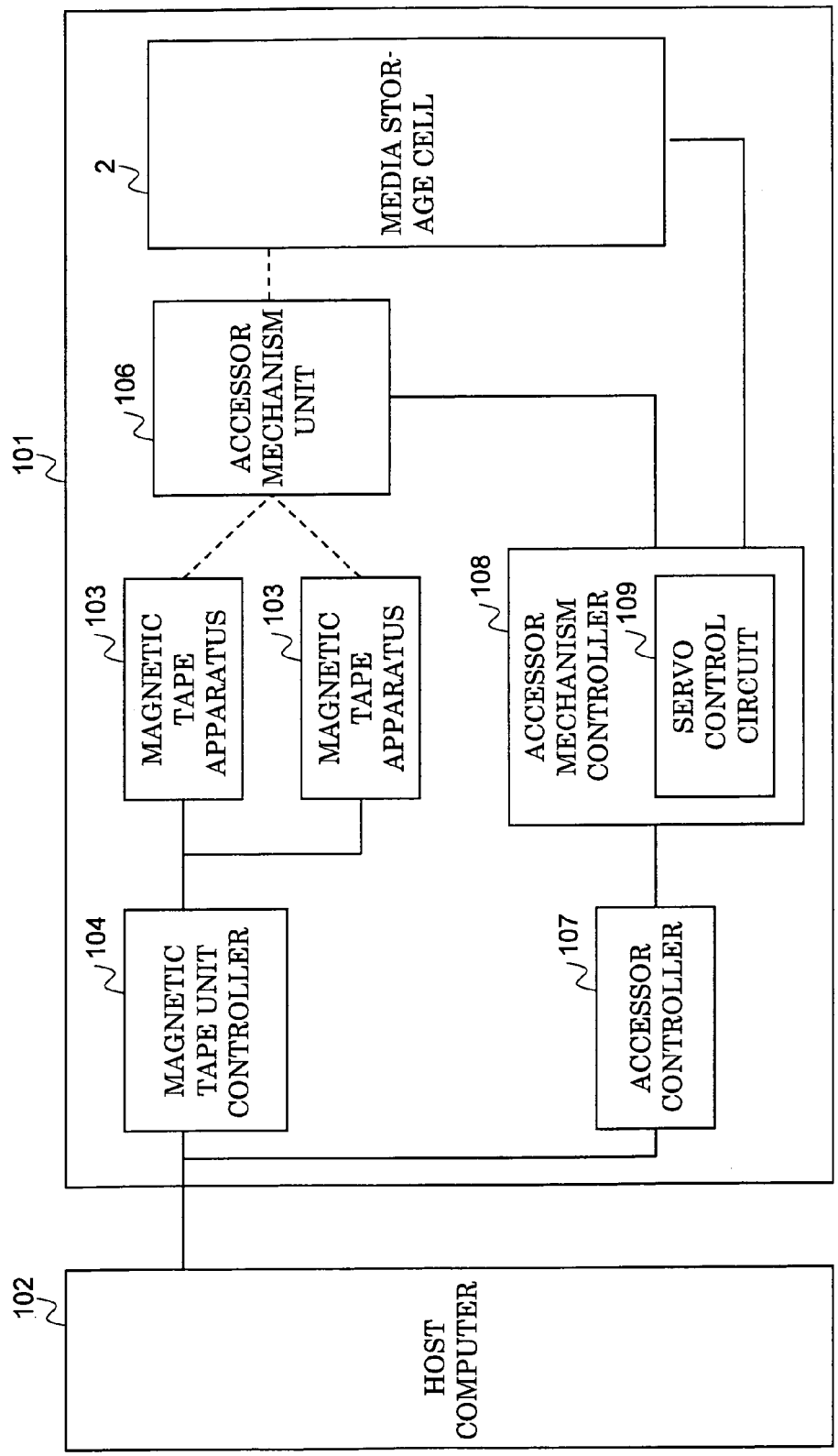
FIG. 2 is a diagram showing an example of a structural of a magnetic tape library apparatus to which the present invention is applied.

FIG. 2 shows an example of a structure of a magnetic tape library apparatus to which the present invention is applied. For example, a magnetic tape library apparatus 101 to which the present invention is applied is an apparatus which performs automatically mounting, removal, storage, recording and reproduction and so on of a cartridge by a request from a host computer 102 as an upper rank apparatus. The magnetic tape library apparatus 101 includes a plurality of magnetic tape apparatuses 103 each of which perform recording and reproduction of data to a magnetic tape, a magnetic tape unit control unit 104 controlling the magnetic tape apparatuses 103 by a request from the host computer 102, a media storage cell 2 having a storage rack which can contain a plurality of cartridges inside, an accessor mechanism unit 106 which is a mechanism withdrawing a cartridge in the media storage cell 2, mounting the cartridge in the magnetic tape apparatus 103, or removing a cartridge from the magnetic tape apparatus 103, and inserting the cartridge into the media storage cell 2, an accessor control unit 107 having an interface with the host computer 102 and controlling the whole accessor, and an accessor mechanism control unit 108 performing control of motors of the accessor mechanism unit 106 and various mechanisms and so on. Additionally, the accessor mechanism control unit 108 includes a servo control circuit 109 which is a control circuit driving DC servo motors of the accessor mechanism unit 106 and so on.

The accessor mechanism control unit 108 and the accessor mechanism unit 106 shown in FIG. 2 correspond to the medium transport apparatus 1 shown in FIG. 1.

Figure 3:
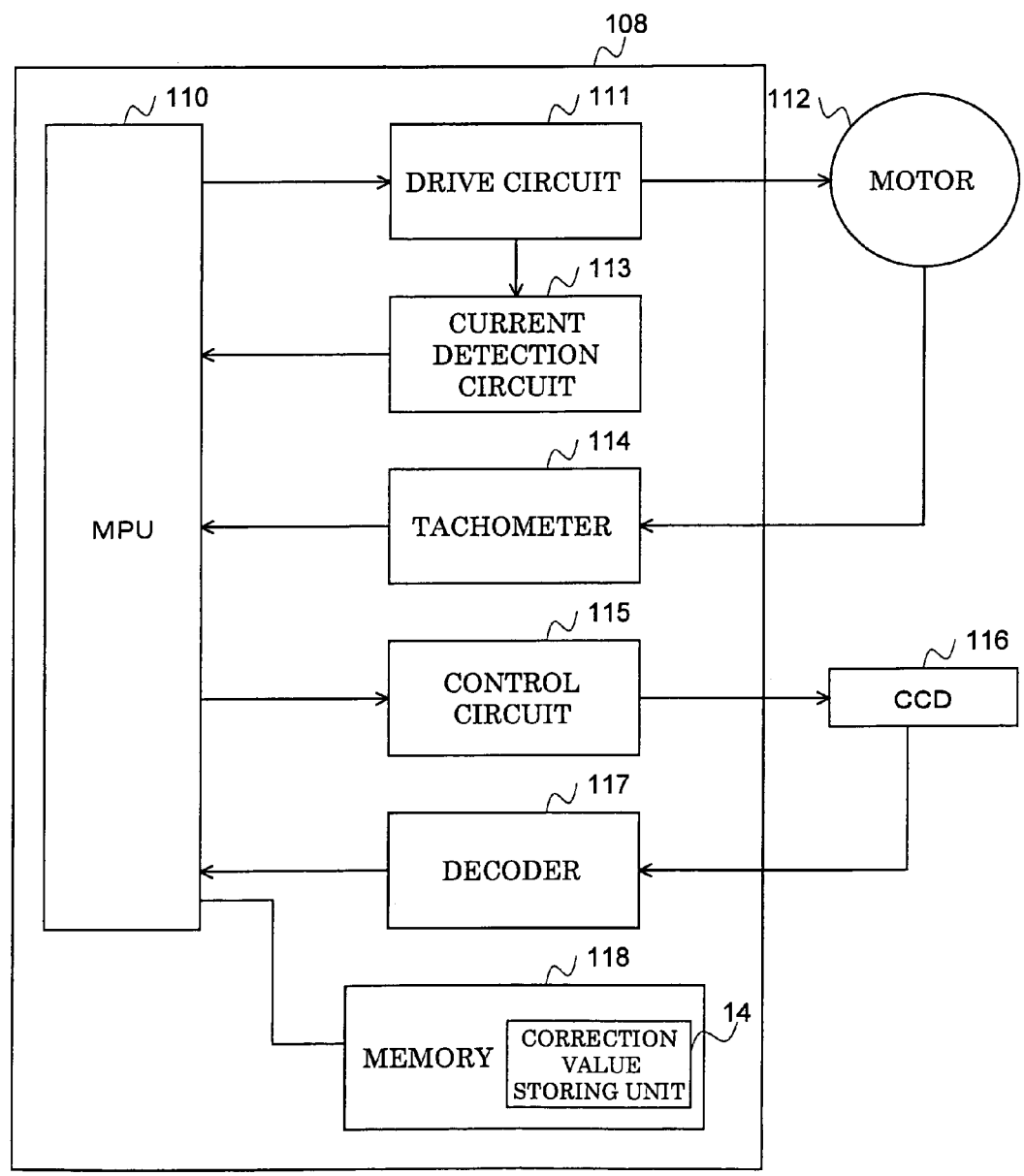
FIG. 3 is a block diagram of an accessor mechanism controller.

FIG. 3 is a block diagram of the accessor mechanism control unit 108 shown in FIG. 2. The accessor mechanism control unit 108 includes a microprocessor (MPU) 110 which controls the entirety by a micro program, a drive circuit 111 which drives a motor 112 incorporated in the accessor mechanism 106, a current detection circuit 113 which detects a drive current of the motor 112, a tachometer 114 which measures revolution speed of the motor 112, a control circuit 115 which controls a CCD 116 as the imaging unit 17, a decoder 117 which decodes image data of the CCD 116, and memory 118 for storing a micro program and data. The above described configuration is the same as a configuration of a conventional technique. The correction value storing unit 14 shown in FIG. 1 is provided in the memory 118.

Although the CCD 116 has a function of imaging the belt-like pattern 4, the CCD 116 is originally a unit for reading bar code for medium identification added to a cartridge of the medium 3. In an embodiment of the present invention, increase in cost is suppressed by using the CCD 116 for this bar code reading also for reading of the belt-like pattern 4.

Although it is explained in this example that the accessor mechanism control unit 108 performs calculation of a deflection amount, storage of a deflection correction value, and correction of a position, it is also possible to give these functions to an upper rank apparatus and to implement the present invention.

Figure 4:
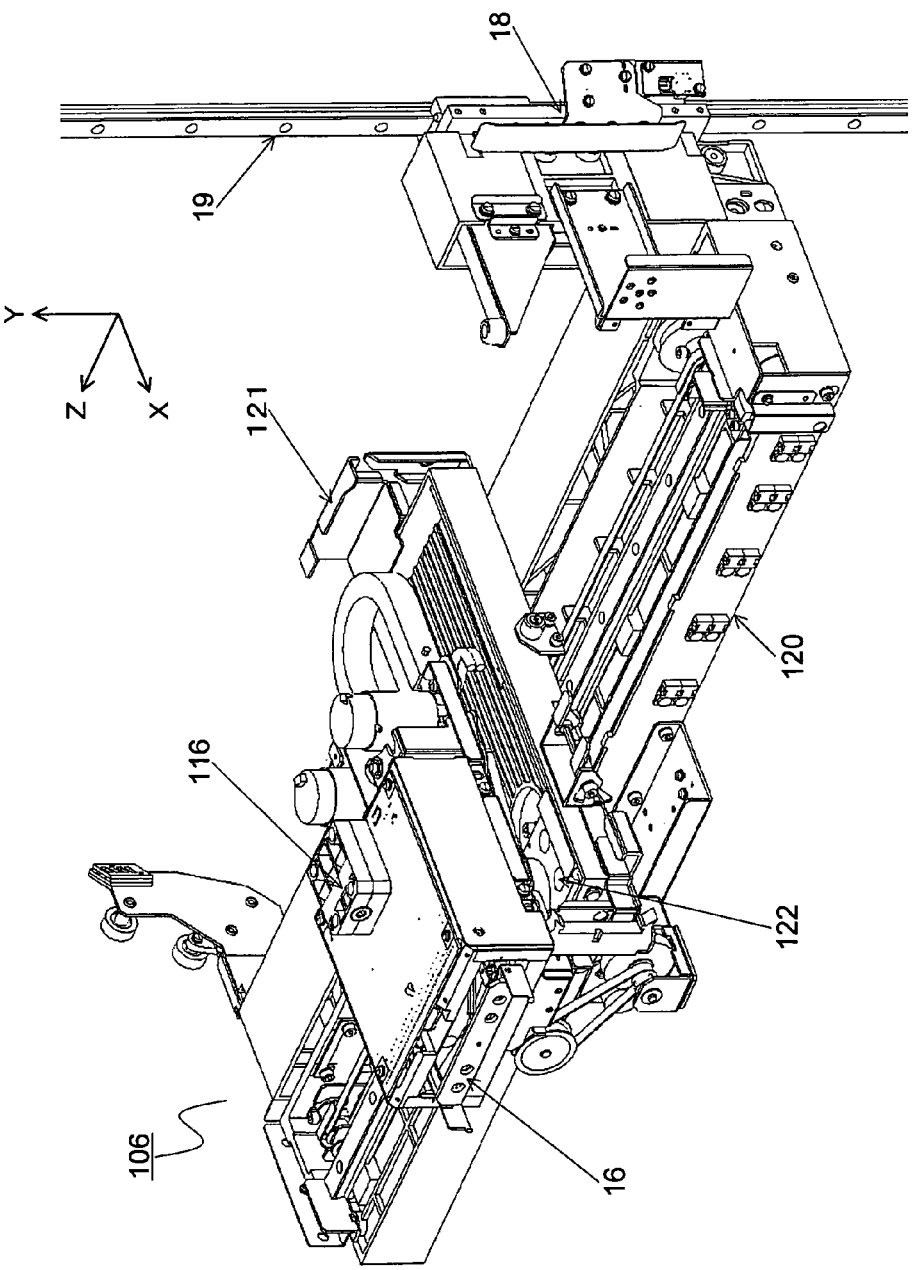
FIG. 4 is a perspective view of an accessor mechanism.

FIG. 4 is a perspective view of the accessor mechanism 106. In the accessor mechanism 106 shown in FIG. 4, an element with the same reference numeral as a reference numeral of an element in FIG. 1 corresponds to the element shown in FIG. 1. A Z mechanism unit 120 is a mechanism corresponding to the arm unit 15 and moving the hold unit 16 in a horizontal Z-axial direction. An X mechanism unit 121 is a mechanism of moving the hold unit 16 in a horizontal X-axis direction orthogonal to the Z-axis. A swivel mechanism unit 122 is a mechanism of rotating the hold unit 16 horizontally. The Z mechanism unit 120 is supported on the LM rail 19 by the support unit 18, and the entirety is movable in a vertical Y-axis direction.

FIGS. 5A and 5B are front views of the accessor mechanism unit 106. FIG. 5A shows the accessor mechanism 106 in a case where the hold unit 16 is in an initial position. When the hold unit 16 is positioned in the cantilever support unit 18 side in this way, a deflection of the Z mechanism unit 120 hardly becomes a problem. However, as the hold unit 16 separates from the support unit 18 as shown in FIG. 5B, the deflection amount H becomes large and accurate alignment of the hold unit 16 with the media storage cell 2 becomes difficult. The present invention solves this problem by a process explained below.

Figure 6:
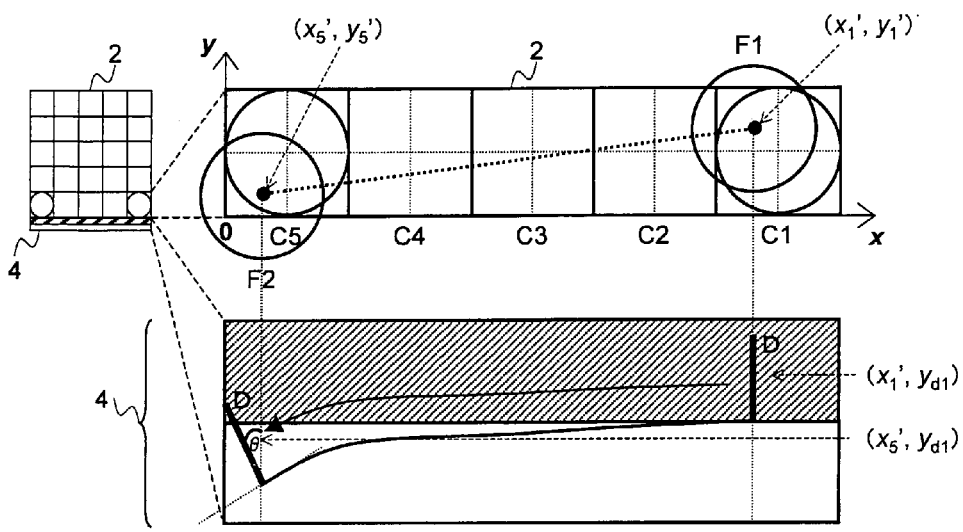
FIGS. 6 to 8 are explanatory diagrams of a method for measuring a deflection amount of an arm unit.
Figure 7:
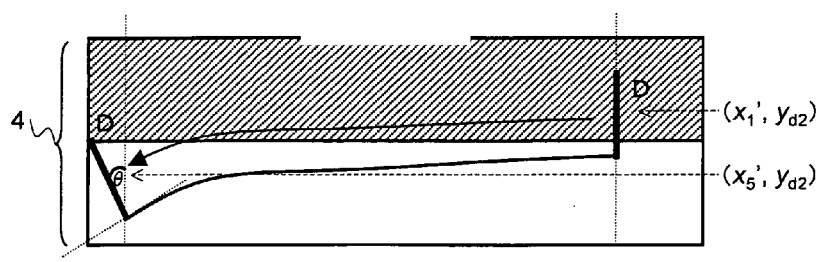
Figure 8:
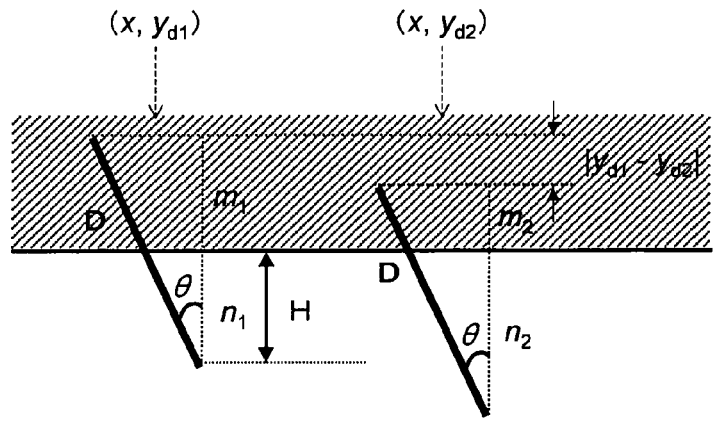

FIGS. 6 to 8 are explanatory diagrams of a measuring method of a deflection amount of the arm unit (Z mechanism unit). Suppose one row of the media storage cell 2 includes five cells C1 to C5. Reference flags F1 and F2 are provided in respective center positions of both the left and right end cells C1 and C5 of the media storage cell 2. These reference flags F1 and F2 are marks which a sensor such as the CCD 116 can read. Hereinafter, for the sake of explanation, let the coordinate value in a horizontal (Z-axis) direction be represented by x, and let the coordinate value in a height direction be represented by y. Additionally, the monochrome belt-like pattern 4 with certain width is added to the media storage cell 2 along the row of the cells C1 to C5 so that a monochrome borderline may become horizontal.

(1) First, as shown in FIG. 6, the center positions of the reference flags F1 and F2 are read by the sensor, and actual center positions $(x_1', y_1')$ and $(x_5', y_5')$ for the cells C1 and C5 are detected.

(2) Next, the hold unit 16 of the transfer robot is moved vertically in a state of keeping a horizontal position at $x_1'$, and is positioned on a boundary line $y_{d1}$ where the entire image data D of the belt-like pattern 4 read by the CCD 116 becomes black. Additionally, it is assumed that the CCD 116 performs a line scan.

(3) Next, the hold unit 16 of the transfer robot is moved to $x_5'$ horizontally in a state of keeping a vertical position at $y_{d1}$. In the meantime, image data D is read by the CCD 116 every x-coordinate of each cell, and is stored in the memory.

(4) The hold unit 16 of the transfer robot is returned again to $(x_1', y_{d1})$, and is positioned at $y_{d2}$ with being further lowered vertically a little. Here, when imaging is performed by the CCD 116, some white is included in image data D.

(5) Similarly to a process of the above described (3), the hold unit 16 is moved to $x_5'$ horizontally in a state of keeping a vertical position at $y_{d2}$. In the meantime, image data D is read every x-coordinate, and is stored in the memory 118. This aspect of reading is shown in FIG. 7.

(6) A deflection amount every x-coordinate is obtained from the image data extracted by a process of the above-described (3) and (5), and $y_{di}$ and $y_{d2}$.

FIG. 8 is an explanatory diagram of a calculation method of a deflection amount of the arm unit (Z mechanism unit). Variables are determined as follows.

It is assumed that total length of the image data is D, an angle between the line scanning direction (image data) of the CCD 116 and a vertical direction is θ, a black-to-white ratio of the image data at a position $(x, y_{d1})$ is $m_1:n_1$, a black-to-white ratio of the image data at a position $(x, y_{d2})$ is $m_2:n_2$, and a deflection amount to be calculated is H.

As apparently from FIG. 8, the angle θ between the direction of the image data and the vertical direction can be found by the following formula.

$$y_{d1} - y_{d2} = \left(\frac{m_1}{m_1+n_1} - \frac{m_2}{m_2+n_2}\right)D\cos\theta$$

$$\therefore \cos\theta = \frac{|y_{d1} - y_{d2}|}{\left(\frac{m_1}{m_1+n_1} - \frac{m_2}{m_2+n_2}\right)D}$$

Hence, the deflection amount H can be found by the following formula.

$$H = \frac{n_1}{m_1+n_1}D\cos\theta = \frac{n_1(m_2+n_2)}{m_1(m_2+n_2) - m_2(m_1+n_1)}(y_{d1} - y_{d2})$$

A value of the deflection amount H calculated as mentioned above is stored and preserved in the correction value storing unit 14 as a deflection correction value.

Figure 9A:
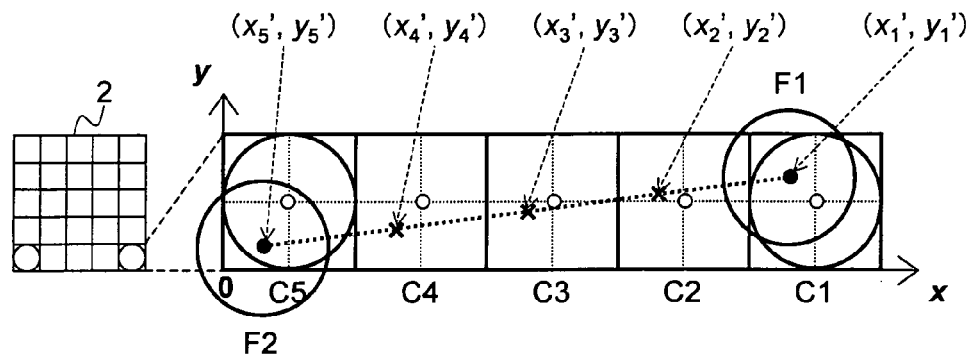
FIGS. 9A and 9B are explanatory diagrams of a method for correcting the deflection amount.
Figure 9B:
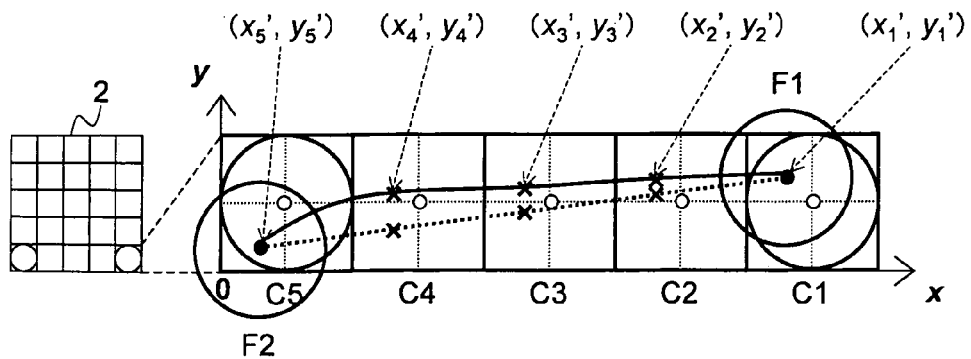

Next, procedure of positional correction using the deflection correction value will be explained. FIGS. 9A and 9B are explanatory diagrams of a correction method of a deflection amount.

(1) As shown in FIG. 9A, the center positions of the reference flags F1 and F2 are read by the sensor, and actual center positions $(x_1', y_1')$ and $(x_5', y_5')$ for the cells C1 and C5 are detected.

(2) Next, center positions of the cells C2 to C4 are calculated based on the detected positions $(x_1', y_1')$ and $(x_5', y_5')$ by linear interpolation. Positions of x marks in FIG. 9A are calculated.

Figure 11A:
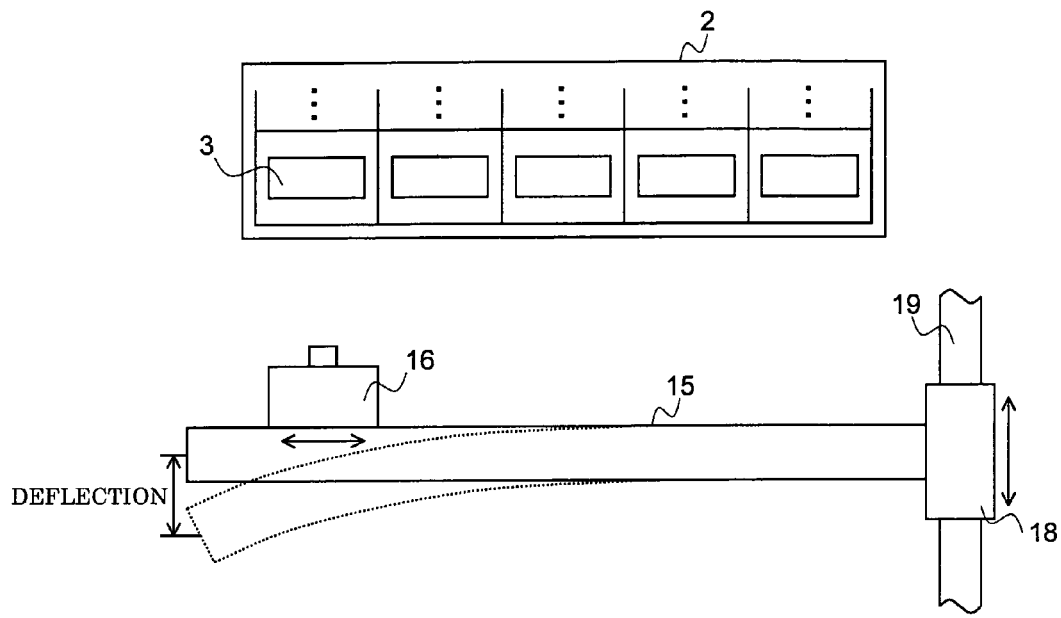
FIGS. 11A to 11C illustrate conventional techniques.
Figure 11B:
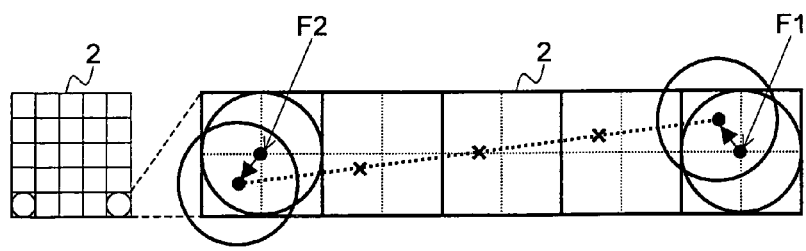
Figure 11C:
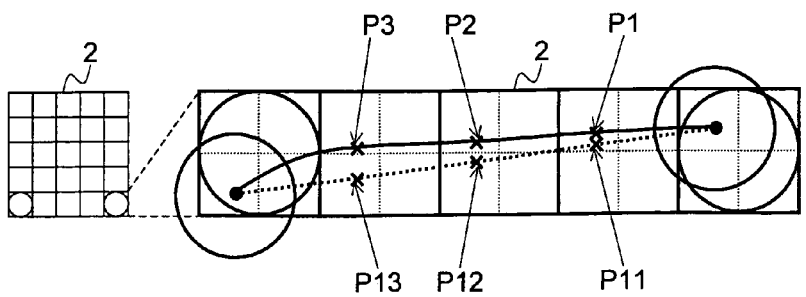

(3) The nominal center positions (namely, positions of O marks in FIG. 9) of the respective cells C1 to C5 which are stored in the memory in advance as the table values are corrected with the positions $(x_1', y_1')$ to $(x_5', y_5')$ which are found at the above-described (1) and (2). The correction to this point is the same as the correction of the conventional method explained with reference to FIG. 11B.

(4) Then, as shown in FIG. 9B, the center position $(x_1', y_1')$ of the cell C1 is made a reference position, and y-coordinates $y_2'$ to $y_4'$ of the center positions of the cells C2 to C4 are corrected with the correction values of the deflection amounts which are stored in the correction value storing unit 14.

Figure 10:
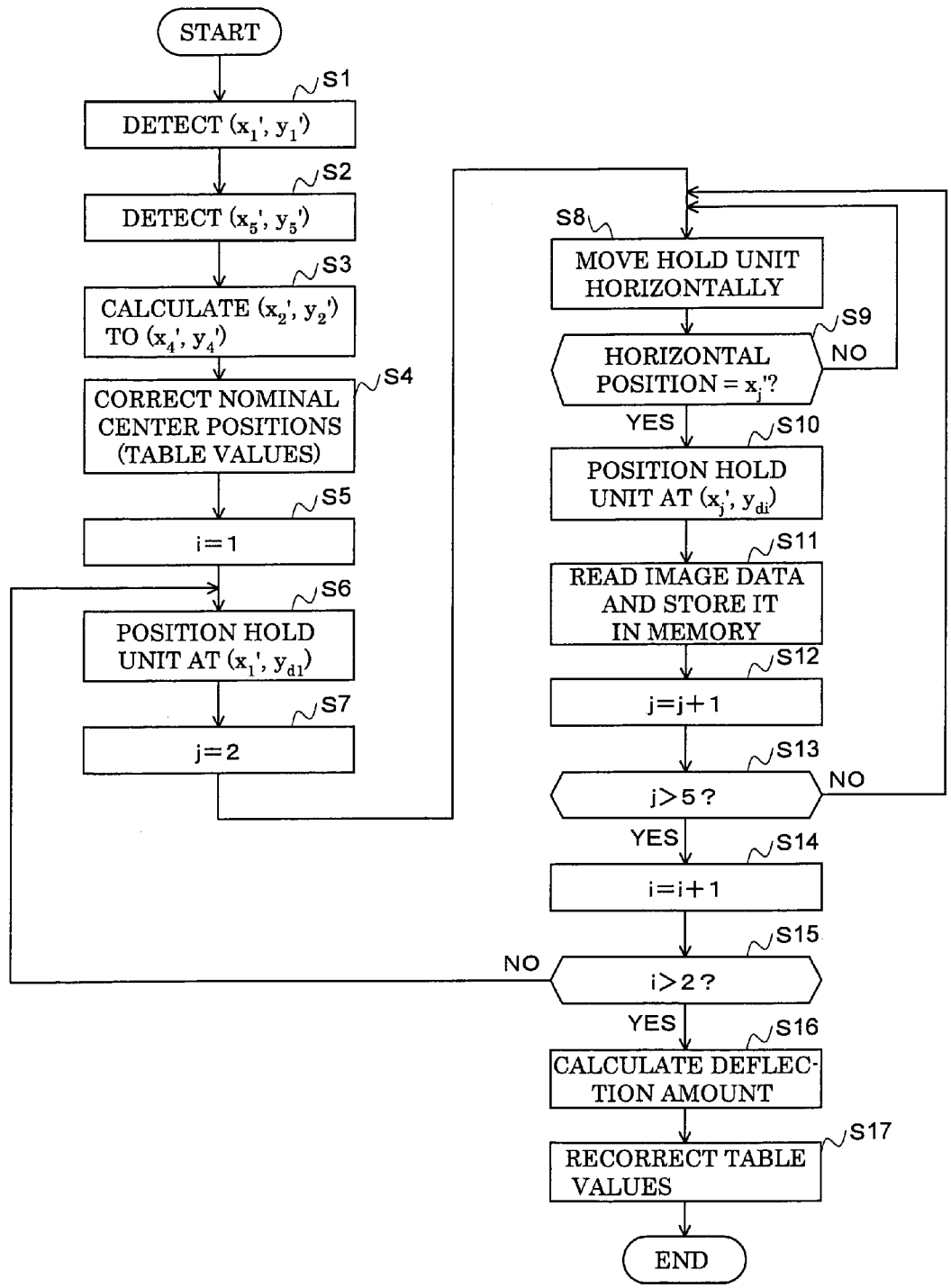
FIG. 10 is a flowchart of a process of detecting and correcting a deflection of the arm unit.

FIG. 10 is a flowchart of a process of detecting and correcting a deflection of the arm unit according to an embodiment of the present invention.

At step S1, firstly, as shown in FIG. 6, a center position of the reference flag F1 is read by the sensor, and an actual center position $(x_1', y_1')$ for the cell C1 is detected. At step S2, similarly, a center position of the reference flag F2 is read by the sensor, and an actual center position $(x_4', y_5')$ for the cell C5 is detected.

At step S3, center positions $(x_2', y_2')$ to $(x_4', y_4')$ of the cells C2 to C4 are calculated based on the detected positions $(x_1', y_1')$ and $(x_5', y_5')$ by linear interpolation.

At step S4, the nominal center positions of the respective cells C1 to C5 stored as the table values in advance are corrected with the coordinate values of $(x_1', y_1')$ to $(x_5', y_5')$ which are found at the steps S1 to S3.

At step S5, a loop variable i is initialized to 1 and the following steps S6 to S14 are repeated twice.

At step S6, the hold unit 16 is positioned at $(x_1', y_{d1})$. Here, $y_{d1}$ is a y-coordinate of a boundary line where the entire image data D of the belt-like pattern 4 read by the CCD 116 becomes black, and $y_{d2}$ is a position which is a little lower than $y_{d1}$. Next, at step S7, a loop variable j is initialized to 2 and the following steps S8 to S12 are repeated four times.

At the steps S8 to S10, the hold unit 16 is horizontally moved to a horizontal position $x_j'$ in a state that a vertical position of the hold unit 16 is kept at $y_{di}$, and is positioned at $(x_j', y_{di})$. At step S11, image data D is read by the CCD 116, and is stored in the memory 118.

At steps S12 and S13, after adding 1 to the loop variable j, it is judged whether j exceeds 5. When it is judged that j is five or less, the process returns to the step S8, and the steps S8 to S12 are repeated similarly. When it is judged that j exceeds 5, the process proceeds to the following step S14.

At steps S14 and S15, after adding 1 to the loop variable i, it is judged whether i exceeds 2. When it is judged that i is 2 or less, the process returns to the step S6, and the steps S6 to S14 are repeated similarly. When it is judged that i exceeds 2, the process proceeds to the following step S16.

At the step S16, a deflection amount of the arm unit is calculated based on the reading result of the image data D at the position $(x_j', y_{di})$. At step S17, the values of the table which stores the nominal center positions of the respective cells C1 to C5 are recorrected based on the calculation result of the deflection amount.

It is not necessary to perform the above described process of detection and correction of a deflection amount each time the medium 3 is made transported. For example, it is enough to perform the process only once at power-up of the medium transport apparatus or at the time of the apparatus being reset owing to a transport error arising.

What is claimed is:

1. A medium transport apparatus which moves a hold unit for a transported medium along an arm unit one side of which is supported, holds the transported medium contained in a media storage cell by the hold unit, and performs insertion and withdrawal, and transportation of the transported medium, comprising:

a pattern reading unit reading a pattern given to the media storage cell and in which a line is drawn horizontally using a sensor provided in the hold unit;

a deflection amount calculating unit measuring a deviation of the horizontal line in the pattern from a reference position corresponding to a position of the hold unit on the arm unit based on the pattern read by the pattern reading unit, and calculating a deflection amount of the arm unit based on the deviation of the horizontal line;

a correction value storing unit storing a correction value for correcting a reference position of the media storage cell in which each transported medium is contained or corrected position information obtained by correcting the reference position based on the calculated deflection amount; and a servo control unit controlling movement of the hold unit using the correction value or the corrected position information stored in the correction value storing unit.

2. The medium transport apparatus according to claim 1, wherein the medium transport apparatus is an apparatus for transporting a cartridge in a magnetic tape library apparatus.

3. The medium transport apparatus according to claim 1, wherein the pattern given to the media storage cell and in which a line is drawn horizontally includes a first region and a second region which are different in color or brightness, and in which a boundary of the first region and the second region forms a horizontal line, wherein the sensor provided in the hold unit images the pattern by a vertical line scan, and wherein the deflection amount calculating unit measures the deviation of the horizontal line from the reference position based on a length of the first region and the second region in the read pattern.

4. The medium transport apparatus according to claim 2, wherein the pattern given to the media storage cell and in which a line is drawn horizontally includes a first region and a second region which are different in color or brightness, and in which a boundary of the first region and the second region forms a horizontal line, wherein the sensor provided in the hold unit images the pattern by a vertical line scan, and wherein the deflection amount calculating unit measures the deviation of the horizontal line from the reference position based on a length of the first region and the second region in the read pattern.

* * * * *